(12) United States Patent
Lam et al.

(10) Patent No.: US 10,225,211 B2
(45) Date of Patent: Mar. 5, 2019

(54) STATISTICAL MULTIPLEXER WITH SERVICE PRIORITY WEIGHTING

(71) Applicant: ARRIS Enterprises LLC, Suwanee, GA (US)

(72) Inventors: Rebecca Lam, San Diego, CA (US); Kyle A. Woodward, Oceanside, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 7 days.

(21) Appl. No.: 15/655,777

(22) Filed: Jul. 20, 2017

(65) Prior Publication Data

US 2019/0028406 A1    Jan. 24, 2019

(51) Int. Cl.
| | | |
|---|---|---|
| *H04L 27/00* | (2006.01) | |
| *H04L 12/927* | (2013.01) | |
| *H04L 12/811* | (2013.01) | |
| *H04L 29/06* | (2006.01) | |

(52) U.S. Cl.
CPC ............ *H04L 47/805* (2013.01); *H04L 47/38* (2013.01); *H04L 65/607* (2013.01); *H04L 47/801* (2013.01); *H04L 65/4084* (2013.01); *H04L 65/80* (2013.01)

(58) Field of Classification Search
CPC .. H04B 7/0452; H04B 7/0626; H04B 7/0632; H04B 7/0634; H04B 1/692; H04L 1/04; H04L 1/0003; H04L 1/0006; H04L 1/0009; H04L 1/0026; H04L 1/0031; H04L 1/0035
See application file for complete search history.

(56) References Cited

U.S. PATENT DOCUMENTS

| | | | | |
|---|---|---|---|---|
| 5,638,359 | A * | 6/1997 | Peltola | H04L 47/10 370/229 |
| 5,970,048 | A * | 10/1999 | Pajuvirta | H04L 47/10 370/230 |
| 6,167,084 | A | 12/2000 | Wang et al. | |
| 6,535,486 | B1 * | 3/2003 | Naudus | H04L 29/06 340/815.4 |
| 6,731,685 | B1 | 5/2004 | Liu et al. | |
| 6,977,894 | B1 * | 12/2005 | Achilles | H04L 47/10 370/235 |
| 7,072,393 | B2 | 7/2006 | Boice et al. | |
| 7,085,322 | B2 | 8/2006 | Ngai et al. | |
| 7,215,637 | B1 * | 5/2007 | Ferguson | H04L 45/00 370/230.1 |

(Continued)

FOREIGN PATENT DOCUMENTS

| | | |
|---|---|---|
| EP | 1542383 A1 | 6/2005 |
| WO | 2016/166532 A1 | 10/2016 |

OTHER PUBLICATIONS

PCT International Search Report & Written Opinion, Re: Application No. PCT/US2018/042976, dated Nov. 12, 2018.

*Primary Examiner* — Sai Aung
(74) *Attorney, Agent, or Firm* — Lori Anne D. Swanson

(57) ABSTRACT

A statistical multiplexer that distributes the total bandwidth of a multiplexed signal among constituent multiplexed signals. Each multiplexed signal may have an associated priority weight and a complexity. In some embodiments, differences between the priority weights are dampened. In some embodiments the priority weights are used to reallocate complexity among the multiplexed signals.

20 Claims, 8 Drawing Sheets

(56) References Cited

U.S. PATENT DOCUMENTS

| | | | |
|---|---|---|---|
| 7,362,702 B2* | 4/2008 | Terrell | H04L 45/00 370/230 |
| 7,418,007 B1 | 8/2008 | Liu et al. | |
| 7,570,584 B1* | 8/2009 | Daley | H04L 12/5601 370/229 |
| 7,742,497 B2* | 6/2010 | Ganti | H04L 12/413 370/230 |
| 8,634,436 B2 | 1/2014 | Jones et al. | |
| 8,699,530 B2 | 4/2014 | Helms et al. | |
| 9,544,602 B2 | 1/2017 | Demircin et al. | |
| 2002/0080786 A1* | 6/2002 | Roberts | H04L 41/5019 370/389 |
| 2002/0159523 A1 | 10/2002 | Wang et al. | |
| 2003/0035385 A1* | 2/2003 | Walsh | H04B 7/18586 370/316 |
| 2004/0114817 A1 | 6/2004 | Jayent et al. | |
| 2011/0096666 A1* | 4/2011 | Davari | H04L 47/10 370/235 |
| 2012/0155554 A1 | 6/2012 | Magee et al. | |

* cited by examiner

STATISTICAL MULTIPLEXER WITH SERVICE PRIORITY WEIGHTING

CROSS REFERENCE TO RELATED APPLICATIONS

None.

BACKGROUND

The subject matter of this application relates to statistical multiplexing systems that encode and multiplex a plurality of source signals for propagation along a common transmission medium.

Digital services such as high definition television and pay-per-view video as well as other digital services such as electronic program guides, weather and stock information, Internet service, etc. have become ubiquitous. Typically, many services, or channels of such services in the case of television programming, are provided to a single customer. However, due to bandwidth limitations of the channel(s) providing such services, to provide satisfactory quality for each service it is often necessary to adjust a bit rate of each of the various individual services (e.g. digital video programs) that are encoded and multiplexed for transmission in a single compressed bitstream to a customer, while simultaneously meeting the constraint on the total bandwidth allotted to the multiplexed channel.

Accordingly, various types of statistical multiplexing systems have been developed that evaluate statistical information related to the content encoded from each source of data, and use that statistical information to temporally adjust the bit allocation among the respective encoders that encode each of those multiplexed sources. For example, many different channels of CATV content may be multiplexed over a single transmission medium, such as a fiber optic line or a satellite communications channel, which has a fixed bandwidth to transmit all the multiplexed channels. However, some channels may require more bandwidth than other channels due to live action, fast motion, frequent scene changes, etc. A statistical multiplexing system will therefore allocate more bits to those channels that need relatively more bits to provide a quality image, and allocate less bits to those channels that require relatively fewer bits to provide a quality image.

FIG. 1, for example, shows a prior art statistical multiplexing system 10 that receives a plurality of source signals 12, each encoded by a selective encoder 14 and multiplexed together by a multiplexer 16 for propagation along a common transmission medium 18. While encoding a respective source signal, each encoder 14 calculates a complexity value for a frame and sends it to a rate control processor 20. The complexity values for video measure activity per macroblock per second, and are generally proportional to the number of bits needed to encode a frame so as to achieve some level of image quality, and may be calculated using any number of measured statistics relating to a frame of encoded video, including spatial and temporal variation in pixel intensity values, frame resolution, I- P- or B- frame type, frame rate, etc. The rate control processor 20, in turn, allocates bits of the fixed bandwidth of the multiplexer 18 among each of the encoders 14 using the received complexity values.

Modern digital video services frequently entail the simultaneous delivery of content having an extreme disparity in service quality. For example, a CATV provider may include, in a group of source signals being statistically multiplexed together (hereinafter referred to as a "statistical multiplex group"), high definition content, standard definition content, 2-D content, 3-D content, different scan types (progressive, interlaced), etc. Given that each of these types of content will also present temporally-varying demands on bit allocation due to the substance of what is broadcast, e.g. live sports, documentary, etc., these statistical multiplex groups often push or exceed the performance limits prior art systems such as that shown in FIG. 1. What is needed, therefore, are improved systems and methods of statistically multiplexing a plurality of source digital services.

BRIEF DESCRIPTION OF THE DRAWINGS

For a better understanding of the invention, and to show how the same may be carried into effect, reference will now be made by way of example to the accompanying drawings, in which.

DETAILED DESCRIPTION

Figure 1:
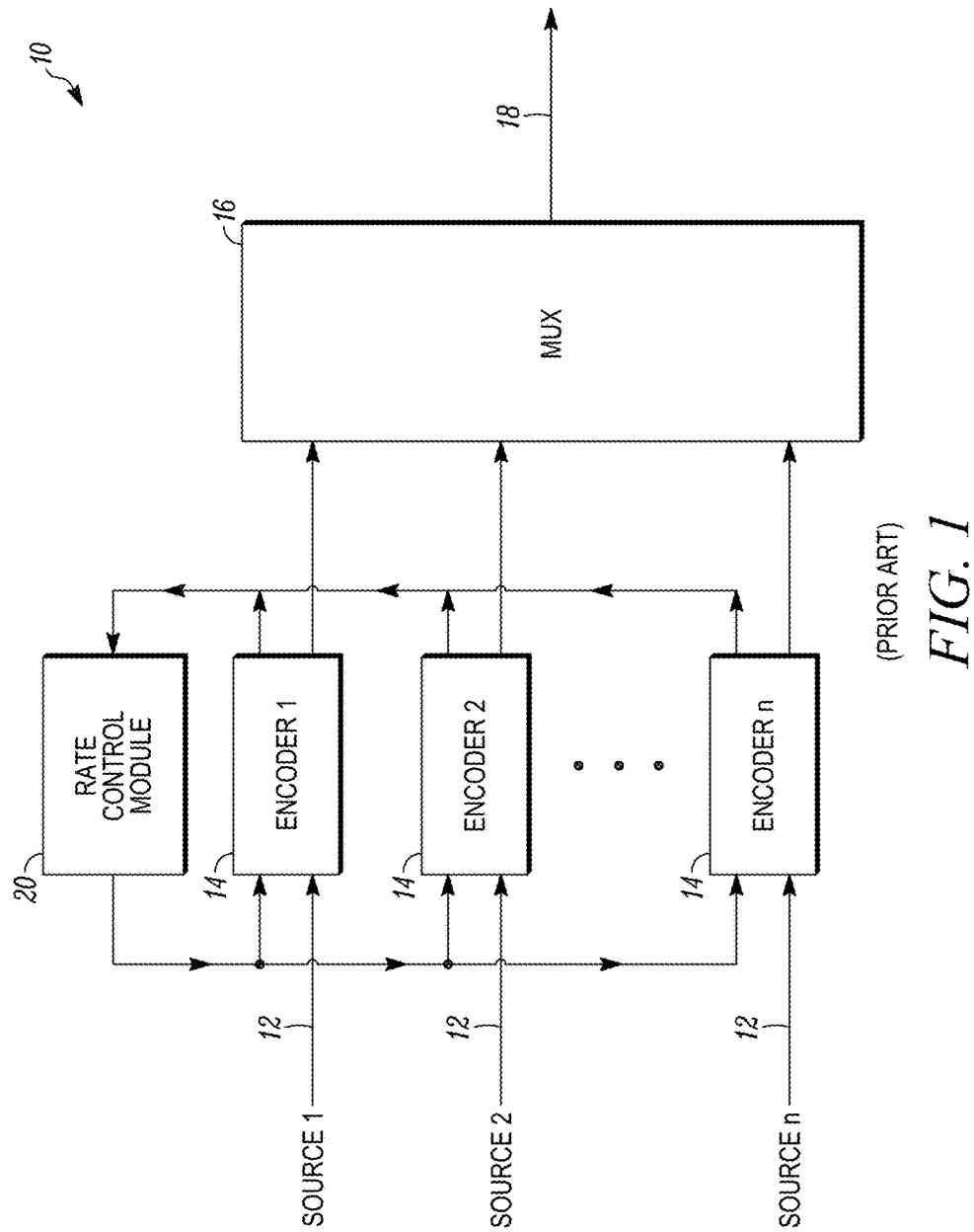
FIG. 1 shows a prior art system for statistically multiplexing a plurality of source signals.
Figure 2:
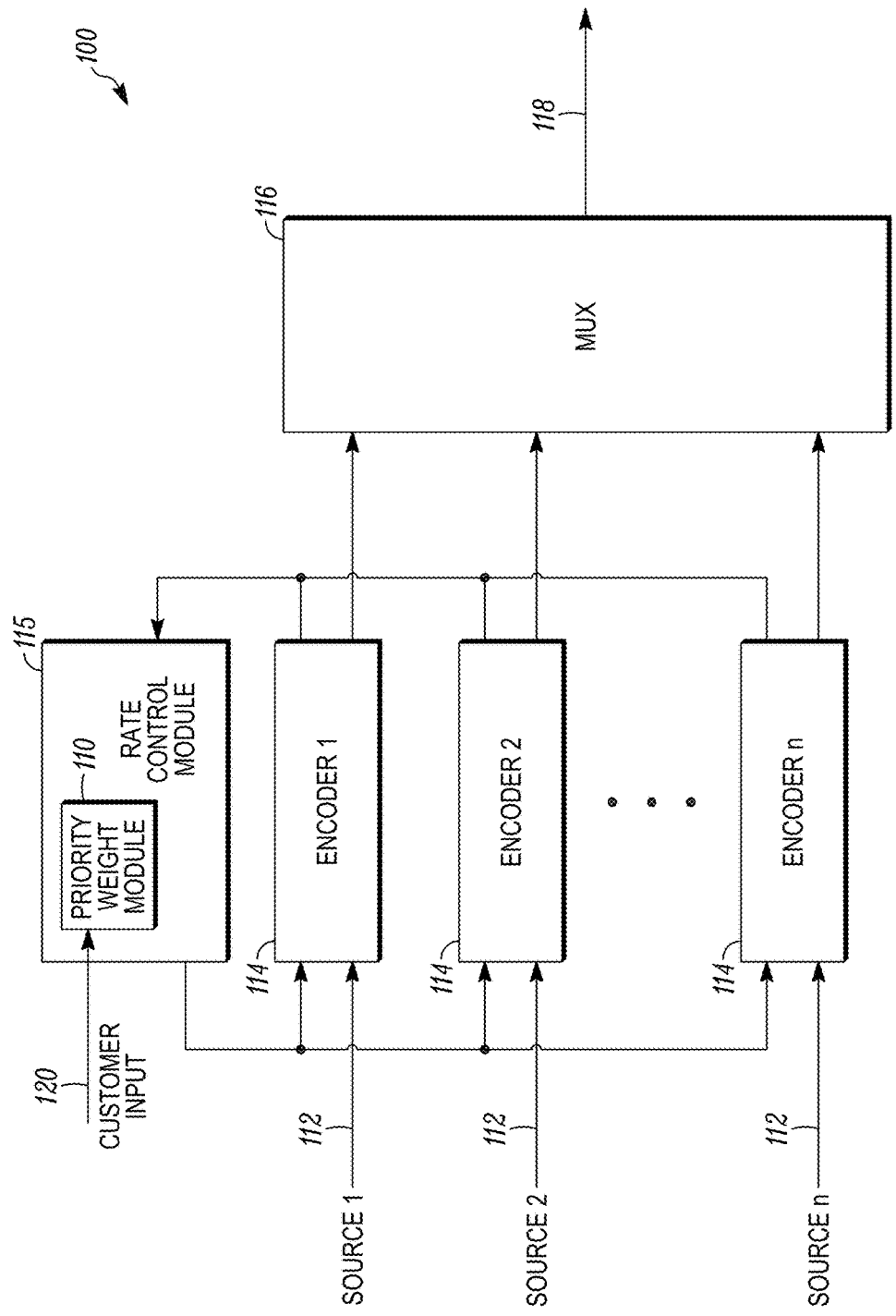
FIG. 2 shows an exemplary system for statistically multiplexing a plurality of source signals using priority weights respectively assigned to each of the source signals.

As noted previously, many prior art statistical multiplexing systems may not be able to distribute the total bandwidth of a multiplexed signal among the constituent multiplexed signals, in a manner that achieves a desired quality for each of the different constituent source signals, particularly where the multiplexed signal includes disparate levels of service quality, e.g. standard definition signals multiplexed with high definition signals. FIG. 2 shows an exemplary statistical multiplex system 100 that improves over the prior art system shown in FIG. 1. The statistical multiplex system 100 receives source signals 112 from one or more content providers that are respectively encoded by encoders 114 and combined by a multiplexer 116 and transmitted over a common transmission channel 118 to, e.g. one or more subscribers. Each of the source signals may, for example, be provided from a content provider such as HBO, ESPN, or any other provider. Those of ordinary skill in the art will appreciate that, although the present disclosure describes FIG. 1 using a plurality of broadcast video signals, other types of content may also be multiplexed together using the system of FIG. 2, including audio channels, data services such as stock and/or sports tickers, Internet service, etc.

Each of the encoders 114 calculates a complexity value for a currently encoded frame (or other grouping of data) and forwards the computed complexity value to a rate control module 115, which in turn uses all the received complexity values to allocate the total bits of the multiplexed channel 118 among the encoders 114. Those of ordinary skill in the art will appreciate that the encoders 114 may calculate the complexity values using any one or more of several statistical features of the encoded source signals, such as spatial and temporal variation in pixel intensity values, frame resolution, I- P- or B- frame type, frame rate, etc., as calculation of complexity values in statistical multiplexing applications is well understood in the prior art.

The system 100 also includes a priority weighting module 110, which receives customer-assigned weights 120 associated with each source program 112. The customer weights may vary over any desired range, for example 1 to 10, 1 to 5, etc. Thus, for example, a content provider of HBO may desire to assign a weight of 10 to a high definition live sports broadcast, a weight of 7 to a standard definition live sports broadcast, 5 to a high definition documentary, etc. The rate control processor 115 may preferably multiply the complexity values received from the different encoders 114 by the weights 120 associated with the content encoded by each encoder, and use the modified complexity values to allocate the total bits of the multiplexed channel 118 among the encoders 114. In this manner, the service provider may use the priority weights to provide extra bandwidth to upper-tier content such as high definition video, 3-D video etc.

An inherent feature of the statistical multiplexing system shown in FIG. 2 is that the bitrate assignments among the encoders for the various sources in the statistical multiplexing group will vary considerably over time as different types of content are provided by the sources 112. For example, at one point in time a high definition talk show with an assigned priority weight of 5 may be multiplexed with a standard definition sports broadcast assigned a weight of 6, while at another point in time those sources may be simultaneously broadcasting a high definition sports broadcast with a weight of 10 and a standard definition documentary with a weight of 3. Such widely divergent weights may sometimes cause the system shown in FIG. 2 to assign too few bits to content assigned low weights, depending on the weights contemporaneously assigned to content from other sources, resulting in unacceptable quality output by some of the encoders 114.

Figure 3:
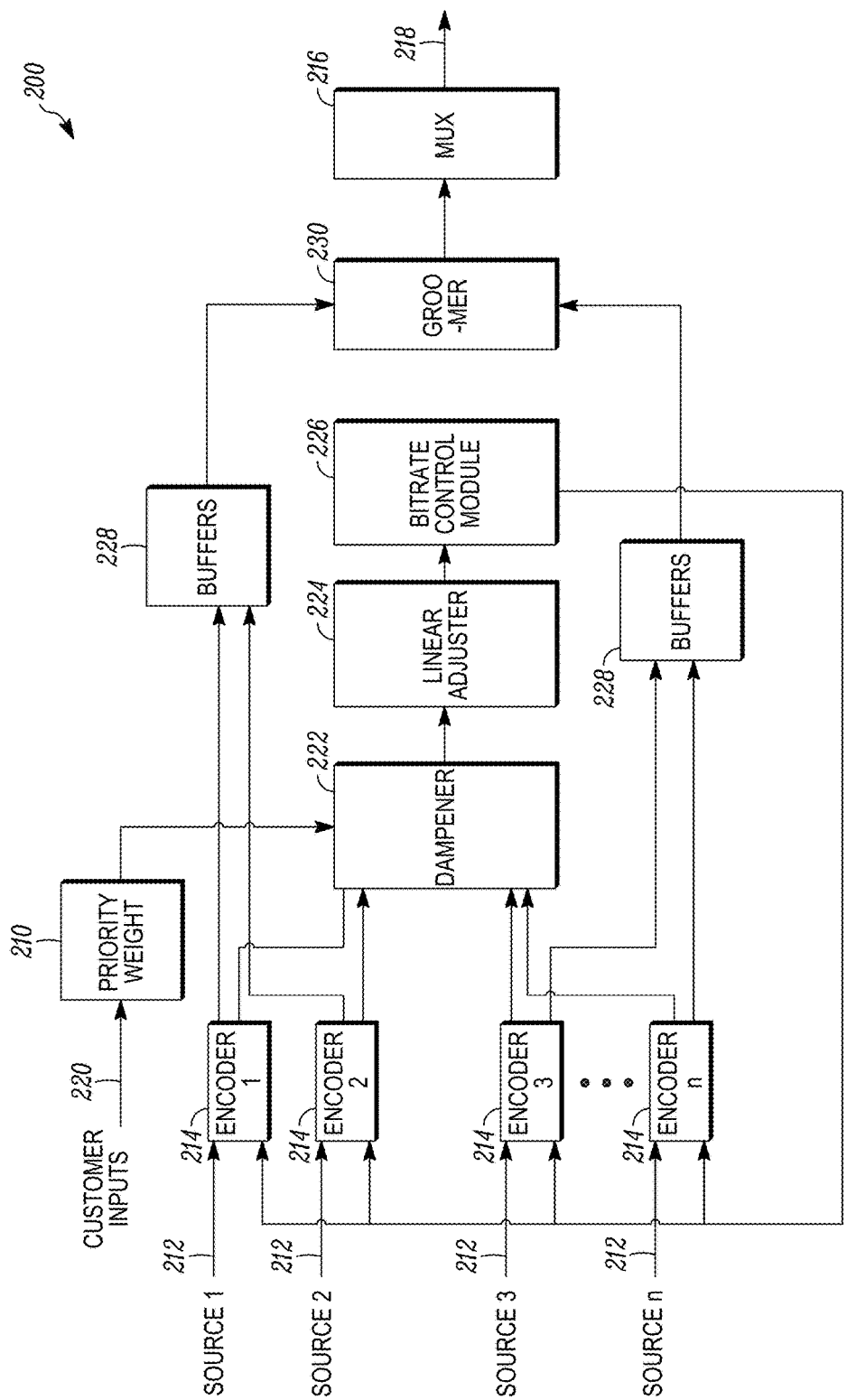
FIG. 3 shows a second exemplary system for statistically multiplexing a plurality of source signals using priority weights respectively assigned to each of the source signals.

FIG. 3 shows an alternate statistical multiplexing system 200 that better protects that content which is assigned a low weight from unacceptable degradation in quality during circumstances when such low-weighted content is multiplexed with other content assigned high weights. The system 200, like that of the system 100 on FIG. 2, receives source signals 212 from one or more content providers that are respectively encoded by encoders 214 and ultimately combined by a multiplexer 216 and transmitted over a common transmission channel 218 to, e.g. one or more subscribers. The system 200 includes priority weighting module 210 that receives respective weights 220 received from content providers, each weight 220 associated with respective content from one of the sources 212, as described above with respect to the system of FIG. 2. in a preferred embodiment, the weights vary between 1 and 10.

Preferably, the system 200 may include respective buffers 228 that store frames of data from the encoders 214 while bitrates are being assigned, and prior to those frames being combined by the multiplexer 216. In some embodiments the system 200 may include a groomer 230 that selects the components (e.g., audio, video, data) for the programs to output as transport streams.

The system 200 also preferably includes a large differential dampener 222 that receives complexity values from the respective encoders 214 and the weights 220 from the weighting module 210. The complexity values in a preferred embodiment vary between 0 and 25000000. The large differential priority weight dampener 222 dampens the differences in the priority weights. Preferably, the large differential priority weight dampener 222 dampens the difference in priority weights using a percentage of the average complexity of the statistical multiplexing group. Specifically, the large differential priority weight dampener 222 may utilize the following equations:

$$DPW_i = (PW_i - \text{Average PW}) * \text{Average Complexity} * SF \quad (1)$$

where $DPW_i$ is a dampened priority weight for the $i^{th}$ source 112, $PW_i$ is the priority weight for the $i^{th}$ source 112, "Average PW" is the average priority weight over the Statistical Multiplex Group, "Average Complexity" is the average complexity over the Statistical Multiplex Group, and "SF" is a sensitivity factor value selected to be between 0 and 1. The sensitivity factor is a configurable parameter used to control the aggressiveness of the priority weights. In one preferred embodiment, where the differences in priority weights are scaled by the average complexity of a stamux group, the sensitivity factor may be selected to fall within the range of 0.01 and 0.10. In another preferred embodiment, the sensitivity factor may fall within the range of 0.03 to 0.07. Those of ordinary skill in the art will appreciate that if other metrics besides average complexity (e.g. maximum complexity, minimum complexity) are used to scale differences in priority weights, other values of a sensitivity factor may be used. Because individual priority weights will vary around the average priority weight, those of ordinary skill in the art will understand that the dampened priority weights will include both positive and negative dampened values, and that the sum of $DPW_i$ over the statistical multiplex group is zero.

The system 200 also preferably includes a Linear Complexity Adjuster 224 that receives respective complexity values from the encoders 214 and adjusts those values based on the dampened priority weights $DPW_i$ received from the large differential priority weight dampener 222. Specifically, the Linear Complexity Adjuster 224 may utilize the following equation:

$$AC_i = C_i + DPW_i \quad (2)$$

where $AC_i$ is the adjusted complexity value for the $i^{th}$ source 112, and $C_i$ is the complexity value for the $i^{th}$ source 112. Those of ordinary skill in the art will appreciate that, because the respective values of $DPW_i$ are both positive and negative and because their sum is zero, the Linear Complexity Adjuster 224 linearly redistributes complexity among the encoders 214, based on the dampened priority values, but in a manner that does not affect the total complexity of all the source signals.

The adjusted complexity values are preferably forwarded to a bitrate control module 226 that, in turn, redistributes bits among the encoders 214 using the adjusted complexity values. Those of ordinary skill in the art will appreciate that one or more of the large differential dampener 222, the Linear Complexity Adjuster 224, and the bitrate control module 226 may be combined into a single module. As one example, the functions of the large differential dampener 222 and the Linear Complexity Adjuster 224 may be implemented by the single equation $AC_i = C_i + (PW_i - \text{Average PW}) * \text{Average Complexity} * SF$.

Figure 4:
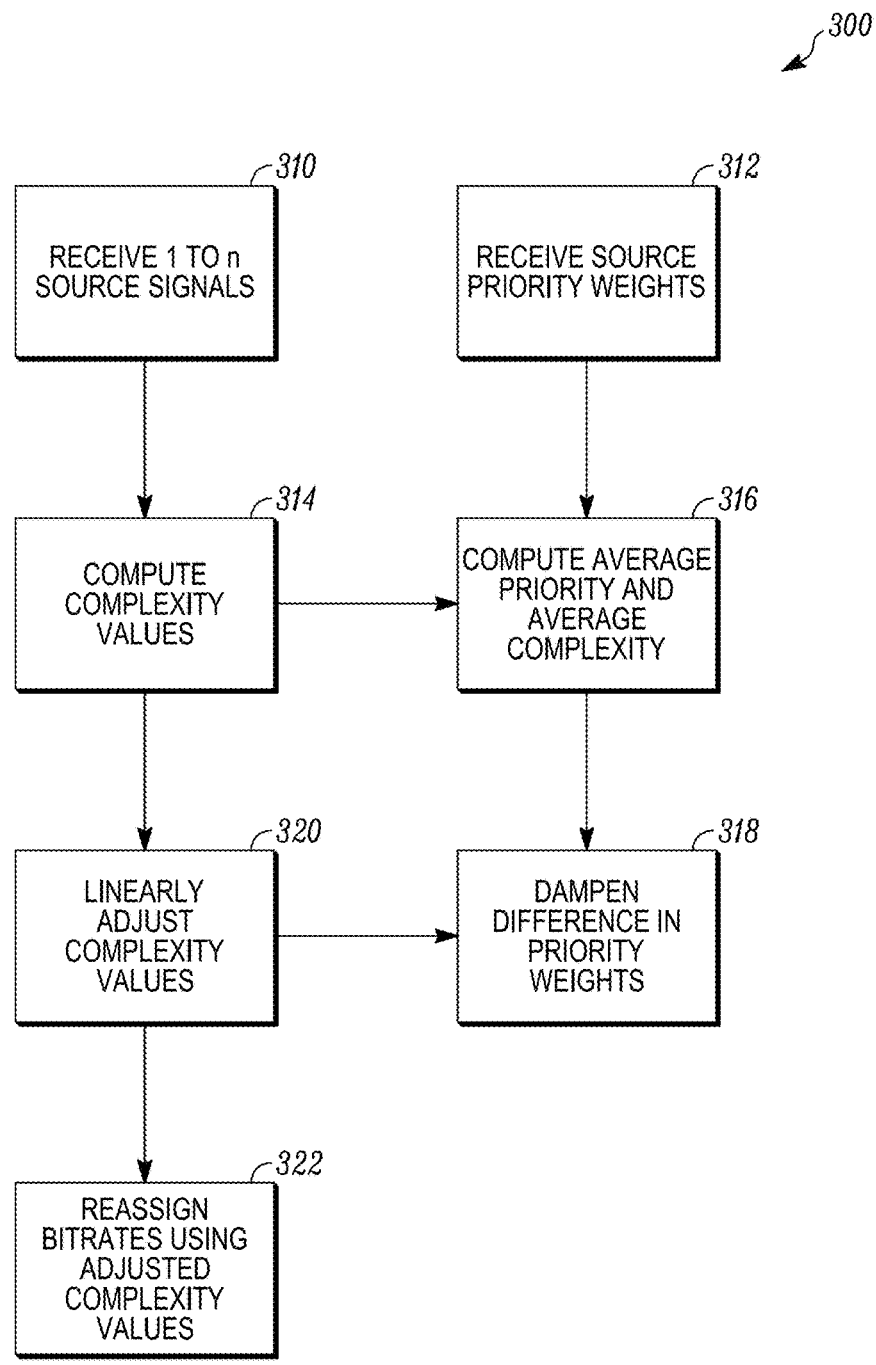
FIG. 4 shows a method used by the system of FIG. 3.

FIG. 4 shows the method utilized by the system of FIG. 3. At step 310, the system 200 receives respective video signals from sources 12, and in step 312 the system 200 receives service priority weights associated with each of those signals. At step 314, complexity values are computed for sequential encoded frames in each of the encoders 214. At step 316, an average priority weight and an average complexity is computed. At step 318 the differences in the received service priority weights are dampened using the equation $DPW_i=(PW_i-\text{Average } PW)*\text{Average Complexity}*SF$ as explained earlier. At step 320 the complexity values received from the encoders are linearly adjusted using the equation $AC_i=C_i+DPW_i$ as explained above. At step 322 the bitrates to the encoders are assigned by the rate control module 220 using the adjusted complexity values. Those of ordinary skill in the art will appreciate that the steps described above do not have to be performed in the order recited. For example, the steps of dampening the differences in priority weights and linearly adjusting the complexity values may be performed simultaneously using the single equation $AC_i=C_i+(PW_i-\text{Average } PW)*\text{Average Complexity}*SF$.

Figure 5A:
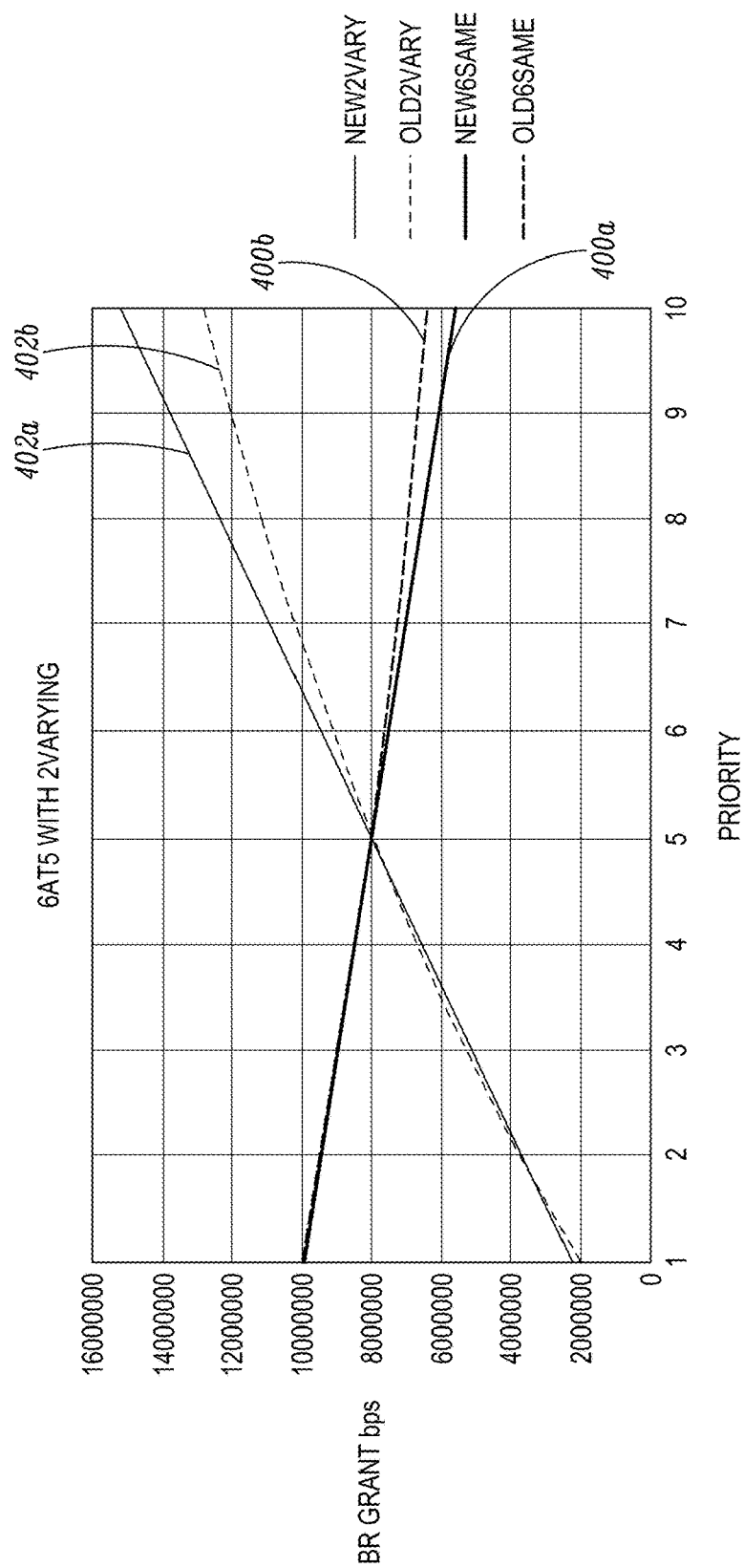
FIGS. 5A and 5B show exemplary differences in bitrate assignment between the system of FIG. 2 and the system of FIG. 3.
Figure 5B:
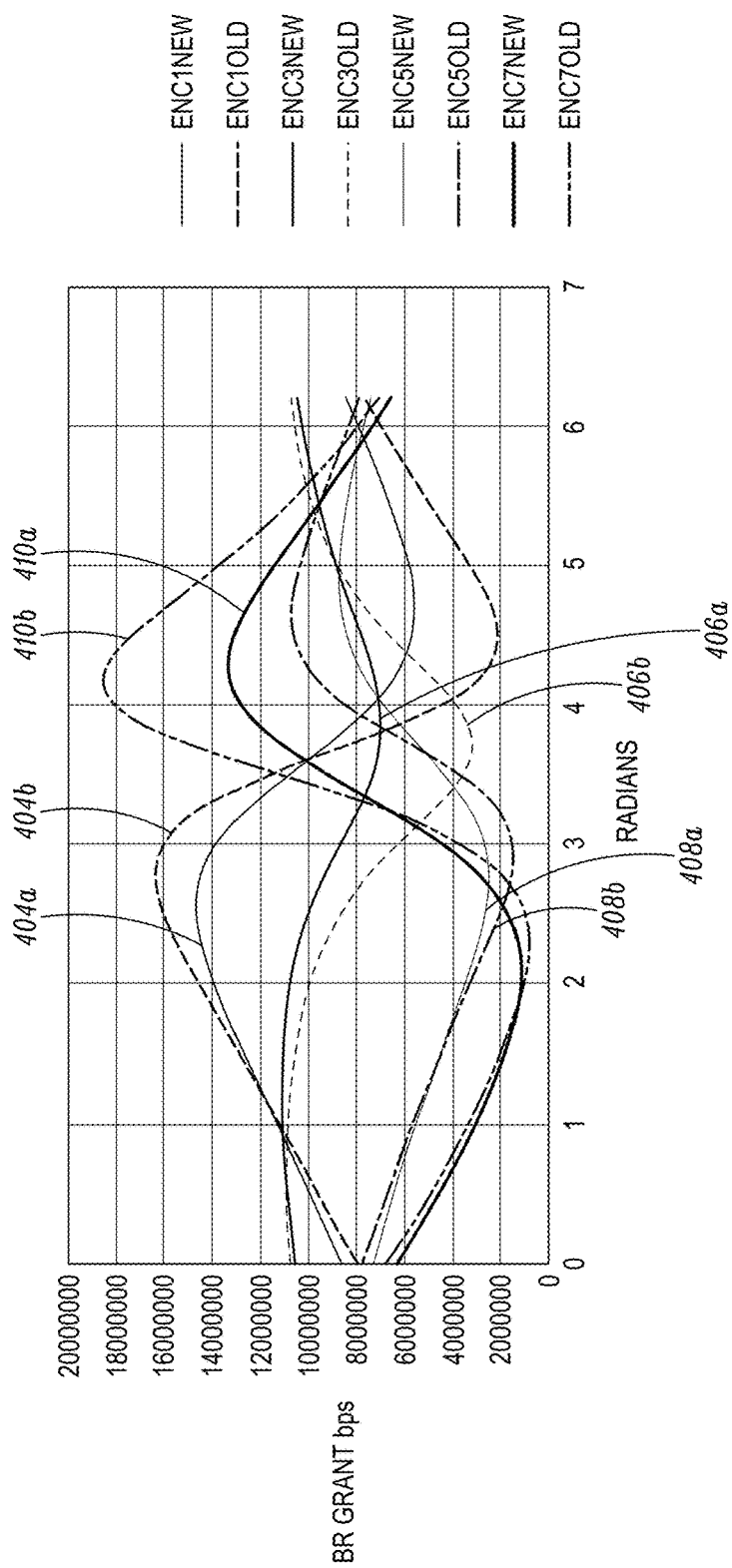

FIGS. 5A and 5B show the benefits of the system 200 of FIG. 3 relative to the system 100 of FIG. 2. The behavior of both systems was simulated using a hypothetical embodiment of a statistical multiplex group comprising eight encoders where six of the encoders have the same constant priority value of 5 (on a scale to 10). The remaining two encoders share a common priority value that varies between 1 and 10. In this simulation, a sensitivity factor of 0.05 was used in the system 200 of FIG. 3. Referring to FIG. 5A, line 400a represents the six encoders having a constant priority value 5 plotted under the system 200 shown in FIG. 3 while line 400b represents the six encoders having a constant priority value 5 plotted under the system 100 shown in FIG. 2. Similarly, line 402a represents the two encoders having a varying priority value plotted under the system 200 shown in FIG. 3 while line 402b represents the two encoders having a varying priority value plotted under the system 100 shown in FIG. 2. As can be seen in FIG. 5A, as the priority value of the two encoders change from 1-10, there is a non-linear change in the bit rate grant values for the system of FIG. 2 and a linear change in bit rate grant values for the system of FIG. 3.

FIG. 5B shows the improved bit rate grant control of the system 200 shown in FIG. 3 relative to the system 100 shown in FIG. 2. Again the statistical multiplex group includes eight encoders where the priority of four encoders is 6 and the priority of the remaining encoders is 4. The complexity waveforms applied to each encoder are sine waves with a phase offset for each of the encoders to introduce variable complexities both in time and among the encoders in the statistical multiplex group. FIG. 5B shows the bitrate grants waveforms from four of the encoders, where waveforms 404 and 406 represent two of the encoders with a priority of 6 and waveforms 408 and 410 represent two of the encoders with a priority of 4, and the suffix "a" represents the waveform for system 200 of FIG. 3 while the suffix "b" represents the waveform for the system 100 of FIG. 2. As can be seen from FIG. 5B, the bit rate grants from the system 200 exhibit bit rate grant changes due to complexity changes in the statistical multiplex group that are slightly moderated relative to the bit rate grants provided by the system 100. This restricts any tendency to over-allocate bits to higher priority encoders at the expense of lower priority encoders.

Figure 6A:
FIGS. 6A and 6B show the picture quality generated by the system of FIG. 2.
Figure 6B:
Figure 7A:
FIGS. 7A and 7B show the picture quality generated by the system of FIG. 3.
Figure 7B:

A test was performed to determine the improvement in video quality that results from using the system 200 shown in FIG. 3, relative to the system of FIG. 2. In this test, four encoders were used in a statmux group, with the relative priorities and complexities shown in the table below. FIGS. 6A and 6B show test results of video frames from the encoder "0" (assigned priority "1") using the system 100 shown in FIG. 2, while FIGS. 7A and 7B show test results of video frames from the encoder "0" (assigned priority "1") using the system 200 of FIG. 3. In this test, a sensitivity factor of 0.05 was used in the system 200 of FIG. 3.

| Member ID | Priority | User Min (bits per sec) | User Max (bits per sec) |
|---|---|---|---|
| 0 | 1 | 250000 | 15000000 |
| 1 | 9 | 250000 | 18000000 |
| 2 | 9 | 250000 | 15000000 |
| 3 | 9 | 250000 | 18000000 |

These test frames show the improvement in quality that results from the system of FIG. 3 for encoding video frames from sources assigned relatively low priorities.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A statistical multiplexing system receiving a plurality of source signals, each source signal associated with a priority weight for the signal, the system comprising:
  a plurality of encoders, each encoder receiving a respective signal from a source and digitally encoding a portion of the signal together with a complexity value associated with the encoded portion;
  a multiplexer that multiplexes the respective signals from each of the plurality of encoders over a transmission channel having an associated multiplexed bitrate;
  a priority weight dampener that modifies at least one of the priority weights so as to reduce the differential between at least two of the priority weights; and
  a rate control module that allocates bits from the multiplexed bitrate among the plurality of encoders using the modified at least one priority weight.

2. The statistical multiplexing system of claim 1 where the priority weight dampener uses a measure of the complexity of the plurality of source signals to modify the at least one of the priority weights.

3. The statistical multiplexing system of claim 2 where the priority weight dampener uses a sensitivity factor to modify the at least one of the priority weights, the sensitivity factor a positive value less than one.

4. The statistical multiplexing system of claim 1 where the sum of modifications to the respective priority weights is zero.

5. The statistical multiplexing system of claim 1 including a complexity adjuster that adjusts the complexity values using the modified priority weights.

6. The statistical multiplexing system of claim 5 where the complexity adjuster reallocates complexity among the source signals while keeping total complexity constant.

7. The statistical multiplexing system of claim 1 where the priority weight dampener uses a sensitivity factor to modify the at least one of the priority weights, the sensitivity factor a positive value less than one.

8. A statistical multiplexing system receiving a plurality of source signals, each source signal associated with a priority weight for the signal, the system comprising:
a plurality of encoders, each encoder receiving a respective signal from a source and digitally encoding a portion of the signal together with a complexity value associated with the encoded portion;
a multiplexer that multiplexes the respective signals from each of the plurality of encoders over a transmission channel having an associated multiplexed bitrate;
a complexity adjuster that linearly reallocates complexity among the source signals; and
a rate control module that allocates bits from the multiplexed bitrate among the plurality of encoders using the reallocated complexity and at least one priority weight.

9. The statistical multiplexing system of claim 8 where the complexity adjuster reallocates complexity among the source signals while keeping total complexity constant.

10. The statistical multiplexing system of claim 8 including a priority weight dampener that modifies at least one of the priority weights so as to reduce the differential between at least two of the priority weights.

11. The statistical multiplexing system of claim 10 where the priority weight dampener uses a measure of the complexity of the plurality of source signals to modify the at least one of the priority weights.

12. The statistical multiplexing system of claim 11 where the priority weight dampener uses a sensitivity factor to modify the at least one of the priority weights, the sensitivity factor a positive value less than one.

13. The statistical multiplexing system of claim 10 where the sum of modifications to the respective priority weights is zero.

14. A method of statistically multiplexing a plurality of signals, the system comprising:
digitally encoding each of the plurality of signals;
receiving a first priority weight associated with a first one of the signals and a second priority weight associated with a second one of the signals, the first priority weight different than the second priority weight;
modifying at least one of the first priority weight and the second priority weight in a manner that reduces the difference between the first priority weight and the second priority weight;
using the modified at least one of the first priority weight and the second priority weight to allocate bits among the plurality of signals; and
multiplexing the plurality of signals.

15. The method of claim 14 where a measure of the complexity of the plurality of source signals is used to modify the at least one of the priority weights.

16. The method of claim 15 where a sensitivity factor is used to modify the at least one of the priority weights, the sensitivity factor a positive value less than one.

17. The method of claim 14 where the sum of modifications to the respective priority weights is zero.

18. The method of claim 14 where a sensitivity factor is used to modify the at least one of the priority weights, the sensitivity factor a positive value less than one.

19. A method of statistically multiplexing a plurality of signals, the system comprising:
digitally encoding each of the plurality of signals;
receiving a plurality of complexity values, each complexity value associated with a respective one of the plurality of signals;
linearly adjusting complexity among the plurality of complexity values in a manner that does not change the total complexity associated with the plurality of signals;
using the adjusted complexity values to allocate bits among the plurality of signals; and
multiplexing the plurality of signals.

20. The method of claim 19 including using at least one received priority weight to linearly adjust complexity among the plurality of complexity values.

* * * * *